July 22, 1924.  N. A. BEST  1,502,542
ALIGNING JIG
Filed Feb. 16, 1923  2 Sheets-Sheet 2
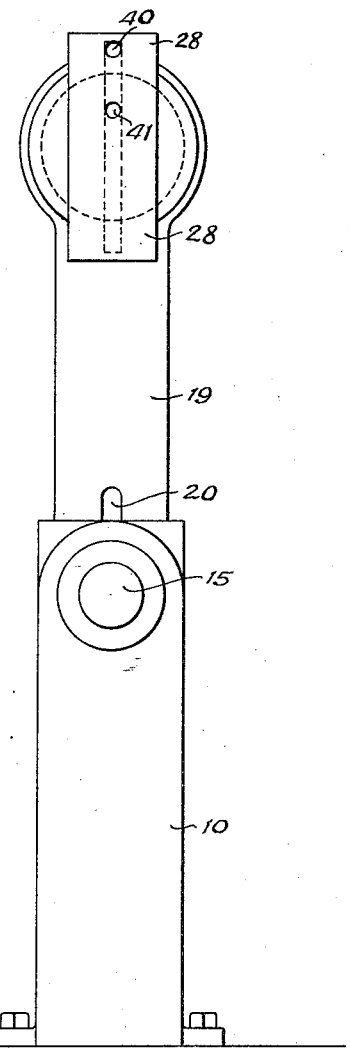
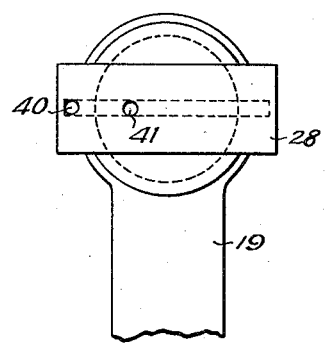
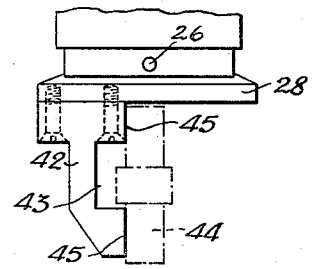
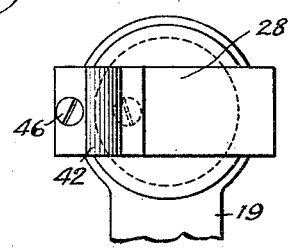
INVENTOR
N. A. BEST
ATTORNEYS Patented July 22, 1924.

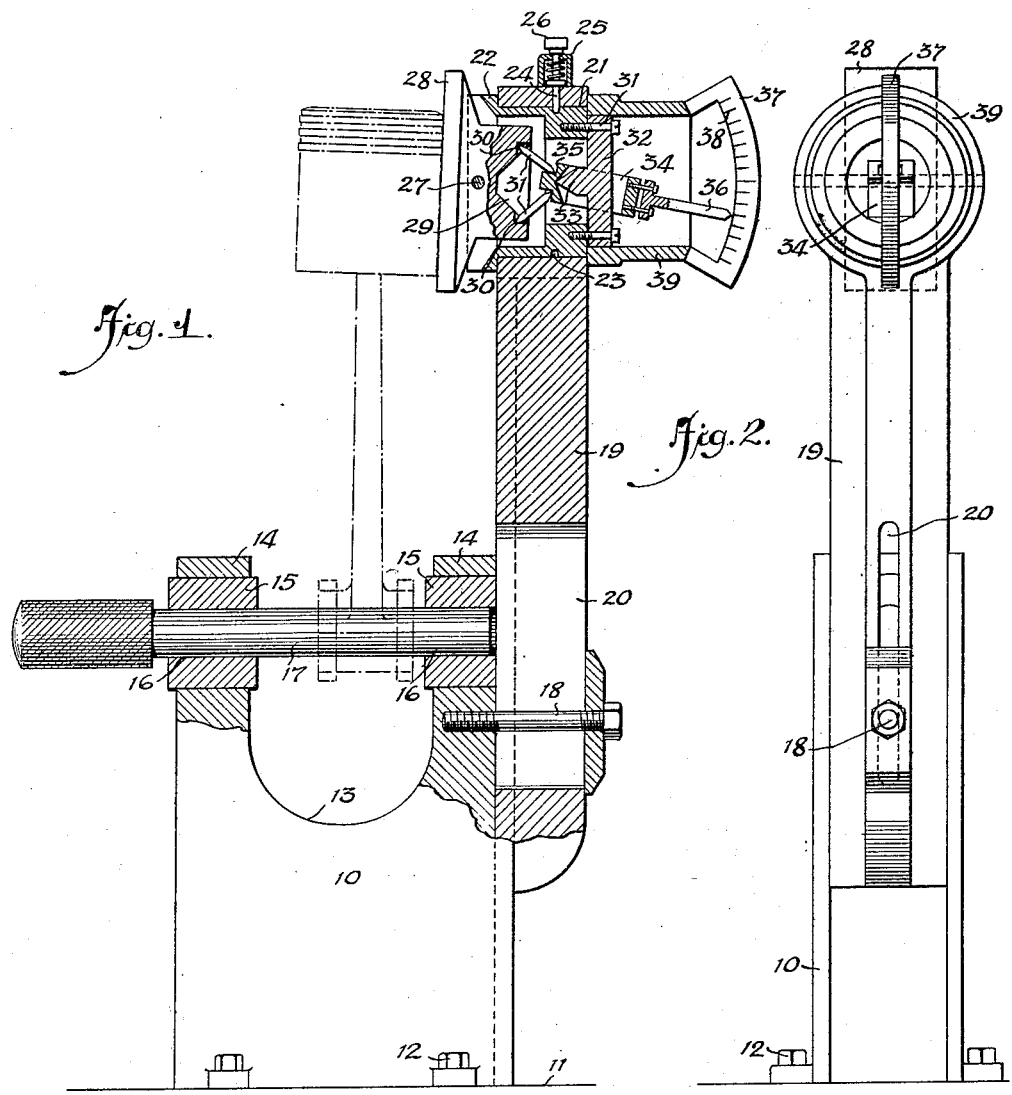

1,502,542

UNITED STATES PATENT OFFICE.

NORMAN A. BEST, OF MIDLAND, MICHIGAN.

ALIGNING JIG.

Application filed February 16, 1923. Serial No. 619,509.

*To all whom it may concern:*

Be it known that I, NORMAN A. BEST, a citizen of the United States, and a resident of Midland, in the county of Midland and State of Michigan, have invented a new and Improved Aligning Jig, of which the following is a full, clear, and exact description.

The present invention relates to new and useful improvements in aligning jigs and while the same is adapted for use in aligning various articles with one another, it is particularly adapted for use in aligning pistons and connecting rods, such as employed in internal combustion motors.

It is one of the objects of the present invention to provide a device of this character by means of which the degree of inaccuracy between the piston and its connecting rod may be determined in thousandths of an inch or other desired measurements.

It is another object of the invention to provide a device which is of such a construction that the same may be tested from time to time to determine its accuracy, thereby insuring proper operation of the device at all times.

With the above and other objects in view, reference is had to the accompanying drawings, in which Figure 1 is a view in elevation, partly in section, of a device constructed in accordance with the present invention, a piston and connecting rod being shown in dotted lines in operative position;

Fig. 2 is a view in front elevation of the device;

Fig. 3 is a view in rear elevation of the device;

Fig. 4 is a detail view showing the device adjusted in a position at right angles to that shown in Figs. 2 and 3;

Fig. 5 is a top plan view illustrating the manner in which the device is employed for testing the twist or distortion of a connecting rod.

Referring more particularly to the drawings, the reference character 10 designates a base, which base is secured to a suitable support 11 by lag screws, bolts, or the like 12. The upper end of this base is cut out as at 13 to provide two parallel arms, or the like, 14. Each of these arms carries a journal block or bearing 15, which blocks or bearings are provided with openings, 16 adapted to receive a pin, or the like, 17.

Secured to one of the faces of the base 10, by means of a bolt, or the like, 18, is a vertically extending column 19 slotted as at 20 to receive the bolt 18, which construction provides for vertical adjustment of the column 19 relative to the base 10 in order that the device may be adaptable for use with connecting rods of different lengths.

The upper end of the column 19 is cut out as at 21, and mounted in the cut-out portion 21, in such a manner as to revolve therein, is a housing 22. This housing 22 is adapted to operate in various positions, and is provided with four notches 23 spaced ninety degrees apart. These notches 23 are adapted to be engaged by a spring bolt 24 carried by a relatively small housing 25, and operated by a finger-piece 26. By this construction it is apparent that the housing 22 is adjusted in any of four positions ninety degrees apart in the column 19.

Pivotally mounted in the housing 22, by means of a pin, or the like, 27, is a face plate 28, and such face plate is adapted for pivotal movement about the pin 27. The rear end of the face plate 28 is hollowed out as at 29. The walls of this hollowed-out portion are provided at diametrically opposite points with recesses 30, and mounted in each of such recesses is a strut 31.

Secured to the housing 22, by means of bolts or cap screws 31', is an arbor 32. This arbor is provided with a projecting portion 33, which forms the pivotal point of a yoke member 34. This yoke member 34 is provided with recesses 35 in which the opposite ends of the struts 31 are adapted to be received, said struts serving the means by which the yoke 34 is rocked about its pivotal point. This yoke 34 carries an index pointer 36 and such index pointer 36 coacts with a scale 37 calibrated as at 38. This scale 37 is carried by means of a bracket or housing 39 suitably secured to the housing 22 and is movable therewith when the same is rotated as heretofore described.

This form of the device operates as follows:

The pin 17 heretofore mentioned is passed through the bearing of a connecting rod, said pin being supported in the bearings 15. The piston of the connecting rod is then engaged with the face plate 28 and said face plate 28 is rocked about the pin 27 until it coincides with the face of the piston, as shown. By rocking the face plate 28 about its pivotal point 27, it is apparent that this movement, through the medium of the struts 31, will be communicated to the yoke 34, and said yoke 34 will move about its pivotal point and its index finger 36 will be moved relative to the scale 37. As the index finger is moved relative to the scale 37, the calibrations 38 thereon will give a reading, setting forth the degree of angle between the piston and its connecting rod.

When it is desired to test the device to see if the same is accurately adjusted, it is only necessary to withdraw the bolt 24 from the opening 23 with which it is engaged and rotate the housing 22 through one hundred and eighty degrees, and after this has been accomplished the reading of the index pointer 36 is compared with the reading thereof previous to the rotating of the housing 22 through one hundred and eighty degrees.

Referring to Figs. 3 to 6, inclusive, it will be noted that the face plate 28 is provided with two openings 40 and 41. These openings 40 and 41 serve the means for securing a notched block 42 to the face plate 28. This block has a notched-out portion 43 provided to permit of a wrist pin shown in dotted lines in Fig. 5 and designated by the reference character 44, engaging the faces 45 of said block, to determine whether or not the wrist pin is in alignment with the connecting rod to which it is attached. The block 42 heretofore mentioned is secured to the face plate 28 by means of screws, or the like, 46.

When the device is used in this manner, the housing 22 is rotated ninety degrees with respect to the position shown in Fig. 1, in order that the block 42 will occupy a horizontal plane instead of a vertical plane, which latter it would occupy were it not rotated through the said ninety degrees.

From the foregoing it is apparent that the present invention provides a new and improved device for aligning connecting rods and pistons, and that in addition to providing means for determining whether the piston and connecting rod are in proper alignment, the device provides means for determining the degree of inaccuracy between the piston and connecting rod when such inaccuracy exists.

What is claimed is:

1. A piston aligning jig comprising a base, means for supporting a connecting rod and piston therefrom, a column projecting vertically from said base, a pivoted face plate carried by said column, a pivoted yoke carried by said column, means for operating the pivoted yoke by the pivotal movement of said pivoted face plate, means carried by said pivoted yoke and movable therewith, and a stationary scale on said column over which said last-mentioned means is movable for indicating the pivotal movement of said yoke and said face plate.

2. An aligning jig comprising a base, means for supporting a piston and connecting rod from said base, a column projecting vertically from said base, a rotatable housing mounted in the upper end of said column, and a pivoted face plate carried by said housing and adapted to swing from a normally vertical plane, and means for indicating the extent of pivotal movement of said pivoted face plate.

3. A piston aligning jig comprising a base, means for supporting a connecting rod and piston on said base, a vertically adjustable column carried by the base and extending vertically thereof, a housing rotatably mounted in said column, means carried by the column for preventing movement of said rotatable housing, a pivoted face plate mounted in said housing and adapted to swing from a normally vertical plane, and means for indicating the extent of pivotal movement of said pivoted face plate.

NORMAN A. BEST.